United States Patent
Koppy et al.

(10) Patent No.: US 8,412,580 B2
(45) Date of Patent: *Apr. 2, 2013

(54) TECHNOLOGY MIGRATION PROGRAM

(75) Inventors: Nicholas J. Koppy, Saint Anthony, MN (US); Bryon Rediger, Woodbury, MN (US)

(73) Assignee: RedKo Innovations, Inc., Saint Anthony, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,075

(22) Filed: Mar. 1, 2010

(65) Prior Publication Data

US 2010/0153203 A1 Jun. 17, 2010

Related U.S. Application Data

(63) Continuation of application No. 10/871,945, filed on Jun. 17, 2004, now Pat. No. 7,707,067.

(60) Provisional application No. 60/479,383, filed on Jun. 18, 2003.

(51) Int. Cl.
*G06Q 30/00* (2012.01)

(52) U.S. Cl. ............ 705/26; 705/14.23; 705/59; 705/16
(58) Field of Classification Search ........................ None
See application file for complete search history.

(56) References Cited

U.S. PATENT DOCUMENTS

| | | | |
|---|---|---|---|
| 5,791,992 A * | 8/1998 | Crump et al. | 463/41 |
| 5,935,005 A * | 8/1999 | Tsuda et al. | 463/41 |
| 7,080,051 B1 * | 7/2006 | Crawford | 705/400 |
| 2003/0037010 A1 * | 2/2003 | Schmelzer | 705/67 |
| 2003/0061104 A1 | 3/2003 | Thomson et al. | |
| 2003/0135429 A1 | 7/2003 | Pous et al. | |

OTHER PUBLICATIONS

Manafy, Michelle, The VHS to DVD conversion market, Apr. 2002, Emedia Magazine, pp. 102.

* cited by examiner

*Primary Examiner* — Fahd Obeid
(74) *Attorney, Agent, or Firm* — Fredrikson & Byron, P.A.

(57) ABSTRACT

A program by which retailers offer customers an exchange of older technology for newer technology. The older technology and newer technology have a common characteristic that facilitates the retailer to give the customer the newer technology for a reduced cost.

15 Claims, 1 Drawing Sheet

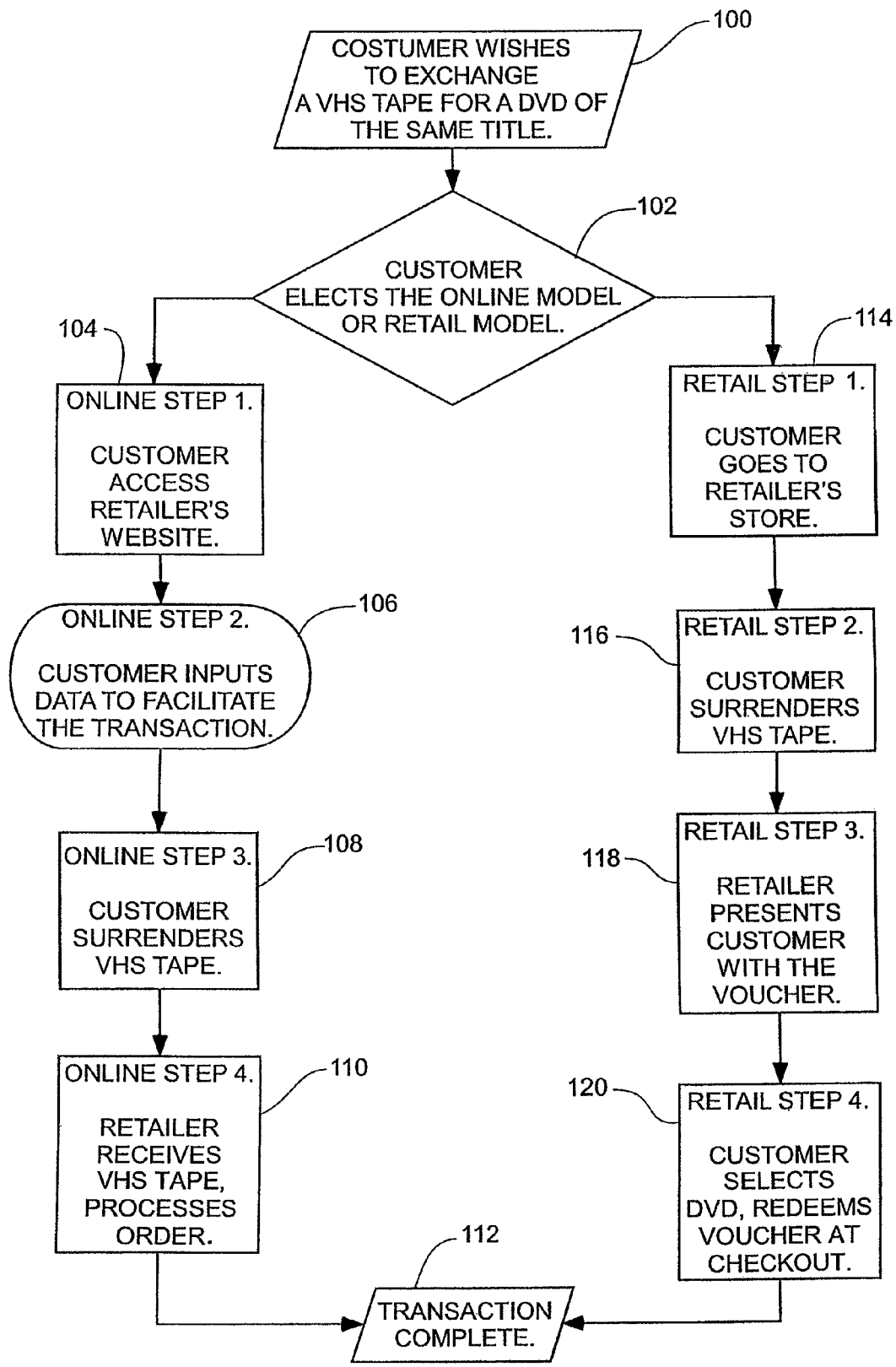

TECHNOLOGY MIGRATION PROGRAM

CROSS-REFERENCE TO RELATED APPLICATION

This patent incorporates by reference and claims priority to the entire contents of U.S. Provisional Application Ser. No. 60/479,383, filed Jun. 18, 2003.

FIELD OF THE INVENTION

The invention relates to a method for cost effectively updating an older technology with a newer technology. More particularly, the invention relates to replacing the older technology with the newer technology, but at a lower price than the retail value of the newer technology.

BACKGROUND

In the worldwide commercial marketplace, change is the only constant. Quite often, the change involves advances in technology, for example, a movement from older to newer technology. Whether such newer technology is deemed as being more efficient than the older technology for example, or being safer for the environment, the movement in technology is often spurred by such motivating factors. However, it is often common to find the general public initially reluctant to accept and/or adapt to the newer technology. Such reluctance can often stem from fears of change and cost. The fear of change generally surfaces because people feel comfortable with the older technology. However, quite often, the older technology becomes outdated, and no longer supported by the marketplace. Thus, an environment is created in which the older technology needs to be replaced with the newer technology. However, such newer technology also comes at a cost which people are hesitant, at least initially, to accept.

The program of the invention is provided to address advances in technology and help provide a vehicle for people that have the older technology to benefit when replacing the older technology with newer technology.

SUMMARY OF THE INVENTION

Certain embodiments of the invention provide a method of replacing an older technology with a newer technology. The method comprises providing an exchange program by which a retailer provides the newer technology at a reduced cost to a customer who owns the older technology. The method also includes requiring that the newer and the older technology each have a portion that is the same.

Additionally, certain embodiments of the invention provide a method of replacing an older technology with a newer technology. The method comprises offering a customer a service by which a retailer collects the older technology from the customer. The method also includes providing an exchange program by which the retailer provides the newer technology at a reduced cost to the customer in exchange for the older technology.

Also, certain embodiments of the invention provide a method of replacing an older technology with a newer technology. The method comprises providing an exchange program by which a retailer provides the newer technology at a reduced cost to a customer who owns the older technology. The method also includes requiring that the newer technology and the older technology each have a portion that is the same, whereby the older technology and the newer technology each having the portion that is the same enables the retailer to provide the newer technology at the reduced cost to the customer.

BRIEF DESCRIPTION OF THE DRAWINGS

FIG. 1 is a flowchart illustrating steps of an exemplary migration program in accordance with certain embodiments of the invention.

DETAILED DESCRIPTION OF THE PREFERRED EMBODIMENT

The following detailed description is to be read with reference to the FIGURE. The FIGURE depicts selected embodiments, but is not intended to limit the scope of the invention. It will be understood that many of the specific steps of the method incorporating the inventive system illustrated in the FIGURE could be changed or modified by one of ordinary skill in the art without departing significantly from the spirit of the invention.

In enabling the invention herein, specific new and old technologies must be detailed to allow for full reader appreciation. Thus, in reference to home viewing entertainment, the new technology will involve Digital Video Discs (DVDs) and the old technology will involve Video Home System (VHS) cassettes or tapes. However, it is contemplated that this invention can be adapted to a variety of other new technologies slowly coming into prominence over time, outdating the old or prior technologies. By describing one specific new and old technology, it should be appreciated that it is not done so with the intent to limit the invention as such.

Since its debut in the marketplace, circa 1995, the Digital Video Disc (DVD) has proven itself to be a superlative format for home theater. In less than a decade, DVD has edged-out the VHS videocassette as the standard for home theater. Until recently (late 2002/early 2003), VHS and DVD movies were sold side-by-side on retailers' shelves across America—but no more. Most retailers have either phased-out VHS entirely, or they are in the process of doing so. For those consumers who endeavor to purchase movies for private viewing in their own homes, the choices seem to have narrowed themselves to DVD or nothing.

In turn, a problem exists for the consumers who have built a library of VHS movies over the years, as transitioning from the VHS to the DVD format poses considerable costs. Equipment is the least of these costs, as DVD players of average quality can be purchased for less than $100. Rather, the bulk of the expense in transitioning from VHS to DVD lies in replicating one's existing library of VHS movies on DVD. The prospect of having to purchase the same movies again is, to say the least, unpalatable for many consumers.

Instead of paying full retail price for DVD versions of the same VHS movies they already own, some consumers have resorted to piracy (making illegal copies). When the DVD format was introduced, the discs themselves were hailed as being virtually impossible to copy, however, this is no longer the case. In addition, recordable DVD drives have increasingly been included as accessories in new home computers. As the cost of recordable DVD drives continues to drop, they become more commonplace. Alternatively, for a modest sum, a recordable DVD drive kit may be purchased for retrofit into an existing home computer, replacing the system's CD ROM drive. This combination of relatively inexpensive hardware for making DVD copies, along with the current ability to copy DVDs, presents a realistic option for the consumer who feels that it is too expensive to buy legitimately manufactured DVD versions of the movies that he or she already owns on VHS. As the prices for DVD recorders continue to fall, and as the copying technique becomes more efficient, more user-friendly and more prevalent across the Internet, this piracy option, even though illegal, is likely to tempt an increasing number of consumers in the future.

The present invention provides a solution in which both the consumers and the makers of media for home theater would be advantaged. Obviously, when the consumer chooses to engage in piracy, the makers of the media are deprived of revenue, to which they would have otherwise been entitled, had a retail sale of the DVD movie occurred. While a consumer may be able to save money by creating a pirated copy of a DVD film instead of buying the DVD legitimately, by doing so, he or she is breaking the law and can be prosecuted for copyright infringement if caught. The solution to the foregoing problem is an Old-to-New Technology Migration Program, or as related herein, a VHS to DVD Migration Program.

This solution is premised on the fact that while the consumer owns the VHS tape itself, he or she does not actually own the contents of it—the consumer merely has a license to view the copyrighted material stored on the tape. So, the price paid by the consumer at the time of original retail purchase can be separated into at least two key components: (1) a license fee, to view the copyrighted material; and (2) some component for the cost of the cassette itself, printing costs for the jacket, as well as certain intangibles (such as royalties). A precise and detailed allocation is not essential for purposes of this discussion. It is most important to note that the copyrighted material on the tape is licensed—not sold—to the consumer, and that some fractional share of the total purchase price represents good and valuable consideration, paid by the consumer, in exchange for receiving such license rights to the copyrighted material. With this in mind, it becomes abundantly clear why a consumer would feel it unnecessary to purchase an additional license to the same copyrighted material, when all (s)he really wants to do is migrate from one format to another. This is the principle on which the VHS to DVD Migration Program rests.

The VHS to DVD Migration Program would call for the consumer to surrender to the media producer his/her VHS copy of a particular film, and upon such surrender, the consumer receives a DVD copy of the same title, in exchange for a modest migration fee. The migration fee would likely be an offset against the media producer's material costs (cost of the disc, jacket, etc. . . . ), and may also be reflective of other intangibles, such as the convenience and value afforded to the consumer by the program. Note that this process does not entail any termination of the license originally granted with the VHS tape—rather, this process depends upon the license remaining in full force and effect throughout the migration process. As a result, the aforementioned migration fee would necessarily be far less than the full retail price of the DVD, since no additional consideration is paid for licensing the copyrighted content; the consumer retains the same license originally issued at the time the VHS tape was first purchased, and (s)he merely migrates from one video format to another, while the original license remains in place.

In certain instances, the DVD version of a given title might contain additional copyrighted material (bonus footage, deleted scenes, director's commentary, outtakes, alternative endings, etc. . . . ) that was not included on the VHS version of the same title. To the extent that a DVD contains such additional copyrighted material, the migration fee would be deemed to include a supplemental license fee for the additional content. Such additional content would be licensed to the consumer on the same terms and with the same restrictions as the other copyrighted material on the DVD or VHS cassette.

In certain embodiments of the invention, the Migration Program would be used as a tool for the creators/licensors of home videos. However, as previously mentioned, the core concept of retaining one's original license to copyrighted material and exchanging one storage media type for another is not limited to the movie industry. The core concept could be easily adapted and applied to a wide variety of media types, such as audio cassettes to compact discs, audio cassettes to digital discs, floppy disks to CD ROMs, printed books to books on tape, and the like. Preferably, the core concept would be applied to any situation where copyrighted material is stored on multiple media types.

In other certain embodiments of the invention, the Migration Program would be incorporated into any situation which involves the introduction of newer technology that outdates older technology, wherein the customer has a license to some proprietary aspect of the older technology and would be willing to turn in the older technology for a reduced cost on the newer technology with the same proprietary aspect. In these other embodiments, one would not be limited only to applications in which there is copyrighted material being migrated. Examples of such proprietary aspects could involve patent rights, trade secrets, etc.

In further certain embodiments of the invention, the Migration Program would be incorporated into any situation which involves the introduction of newer technology that outdates older technology, wherein the customer would be willing to turn in the older technology for a rebate on the newer technology. In these other embodiments, one would again not be limited only to applications in which there is copyrighted material being migrated. Examples could involve household appliances, telephonic devices, computers, etc. Motivating factors in these embodiments for the consumer to turn in their older technology would involve reduced cost for the newer technology, ridding oneself of the older technology, and potentially reducing costs on upkeep or maintenance in regard to the older technology. Motivating factors in these embodiments for the retailer to provide a rebate on the newer technology would involve higher sales volume, increased product recognition, and potentially receiving rebates from the government in the from of tax breaks for saving energy or the environment by taking in and safely disposing of the older technology.

Ultimately, it would be up to the user of the core concept to incorporate the idea into his/her business, whatever way is most feasible. The method of implementation and use of the core concept would obviously vary, depending upon the user's business and the type of technology involved. Nonetheless, the inventors have included—for exemplary purposes only—two possible embodying methods of using the core concept in business. Once again, the movie industry will be depicted as the sample business or industry. A flowchart illustrating the steps of the two methods of the sample industry is illustrated in FIG. 1.

For purposes of this example, the inventors will delineate two methods of implementing the core concept into a business model. One model contemplates an online exchange of a VHS tape for a DVD of the same title, through a retailer's web site, while the other contemplates an actual walk-up exchange, performed at the retailer's place of business. The parties depicted in the example are the Customer, the Retailer and the Filmmaker. It should be appreciated that the terms Customer, Retailer, and Filmmaker could each be replaced by a number of relatively similar terms that those skilled in the art would also recognize. For example, one could use consumer, client, patron, etc. for Customer; one could use merchant, vendor, dealer, etc. for Retailer; and one could use film studio, production company, etc. for Filmmaker. As such, the terms Customer, Retailer, and Filmmaker are used herein for conventional purposes and not with the intention of limiting the invention as such. In addition, the term Retailer used in this context can be interpreted as any party involved in the chain of distribution of the technology including, but not limited to, the Filmmaker and/or authorized agents (e.g., parties operating distribution houses, video rental stores, etc.). Further, it should be appreciated that the parties may change given other technologies. For instance, a distributor could be used in combination or as an alternative to the retailer. Finally, although the following examples discuss a franchise agreement (where the Retailer buys the rights to facilitate the exchanges on the Filmmaker's behalf) a separate franchise agreement is not necessarily required in all cases where the core concept is used.

Both methods have the same first two introductory steps. First, in step 100, the Customer decides to exchange a VHS tape for a DVD of the same title. Next, in step 102, the Customer elects to facilitate the exchange either in person by way of the RETAIL model, or over an internet connection by way of the ONLINE model. Customers who prefer not to go to the retail store, or who live a considerable distance from a participating retailer, would likely elect the ONLINE model as set forth below.

In choosing the ONLINE model in step 102, the Customer will access the website of a participating Retailer in step 104 to initiate the VHS to DVD Migration Program. Retailers may promote the VHS to DVD Migration Program via whatever advertising media the Retailer chooses, subject to the guidelines established in the separate franchise agreement between the Retailer and Filmmaker/distributor.

In step 106, the customer will be prompted to input data to facilitate the transaction. The dedicated page on the participating Retailer's website will prompt the Customer to choose from an alphabetical pull-down menu (or similar mechanism) to identify the VHS title which Customer wishes to migrate to DVD. To the extent possible, the website may prompt the Customer to examine the VHS tape and/or jacket for unique identifiers such as alpha-numeric codes, etc., and subsequently enter such information (to authenticate the VHS tape).

The web page would further prompt the Customer to enter his/her mailing address, credit card number, or any other relevant information required to complete the transaction. The Retailer will likely use the same secure socket processing methods it may already have in place for processing online credit card orders via the Retailer's website.

Upon submission of this information, the system would generate and display a return authorization code, and prompt the Customer to mail the VHS tape(s) to a specified address, where the tape(s) is/are to be received by the participating Retailer.

Once the information is received, but before the return authorization number is displayed, the Retailer might program a pop-up window to offer the customer a special discount on other in-store merchandise, such as a DVD player (participating manufacturers). The discount would be valid only if the Customer elected to place the order for the merchandise at the same time as the exchange. By way of example: "Do you have a DVD Player? Include one with this order, and take 10% off the manufacturer's retail price. Click here for a list of qualifying players . . . " In addition, Customer may also receive discounts on other related items such as clothing apparel, toys, watches, etc.

In step 108, the Customer would surrender the VHS tape, typically by mailing the subject VHS tape to the address indicated by the web page, and conspicuously marking the package with the return authorization code generated by the web page (or the web page may prompt the customer to print the final screen, and include the printout with the VHS tape).

In step 110, the participating Retailer will receive the Customer package, generally at the address it designates on the web page. This will be dependant upon the distribution model established by the respective Retailer. For example, the Retailer may choose to have the VHS tape returned to the nearest participating Retailer location or the Retailer may have a national location established for the specific processing of returned VHS tape(s) and subsequent delivery of the selected DVD(s).

Additionally in step 110, the tape will be processed by the Retailer's personnel, in accordance with the franchise agreement from the Filmmaker. This will likely include opening the end cap of the tape and cutting the magnetic tape, or some other method for disabling or partially destroying the tape.

Retailer will generally keep in their possession, for a specified period of time (per the franchise agreement), the surrendered VHS tapes in order for the Filmmaker to verify the numbers and/or audit Retailer. The Filmmaker may require an on-site audit of the Retailer's VHS collection, which may include the actual physical identification of all respective VHS tapes, software data, or any other form of record keeping established per the franchise agreement. In addition, the Filmmaker may require offsite verification in which the respective Retailer may be required to mail all surrendered VHS tapes to the Filmmaker for audit purposes. In the event an audit reveals a deficiency in the number of tapes in the Retailer's possession versus the number of tapes actually reported to the Filmmaker, the Filmmaker may have the option to terminate the franchise agreement with the respective Retailer and recoup the costs, if any, associated with the deficiency.

Also the Retailer's personnel will catalog the receipt of the Customer's VHS tape, in the manner prescribed by the franchise agreement with the Filmmaker.

Per the franchise agreement, the Retailer will establish an external connection with the Filmmaker (i.e. web link, etc.) using the Filmmaker's prescribed software and data security program, in which receipts of VHS tapes surrendered will be collected and transmitted to the Filmmaker's network. The data may be transmitted on a daily, weekly, or bi-weekly basis, dependant upon the volume and other various factors determined and established per the franchise agreement between Retailer and Filmmaker.

At the time Retailer establishes the connection to the Filmmaker's network, an automated data dump will occur, whereby all of the exchanges in the Retailer's system (since the previous data dump) will be uploaded to the Filmmaker's network. Based upon the information received from the Retailer's data dump, a credit will be calculated by the Filmmaker's network, which reimburses Retailer for the discount afforded to each Customer, via the VHS to DVD Migration Program. Credits will only be for the DVDs related to the VHS to DVD Migration Program and not for any other discounts offered by Retailer to customer (i.e. merchandise, DVD players). Should the Filmmaker elect to audit the results of the Retailer's data dump, the credit will be held until the audit is complete. Upon completion of the audit (or within a reasonable time after the data dump, if no audit is performed) the credit will accrue to the Retailer. The Retailer might elect to apply such credit amount to future orders of DVD items from the Filmmaker, or the Retailer may elect to cash out the credit, in which case a check for the amount of the credit (or an electronic funds transfer) will be disbursed to the Retailer.

Finally, the Retailer's personnel will locate, package, address and ship a DVD of the same title to the Customer, at the address specified in the online form submitted by Customer.

The franchise agreement may set out service levels, specific to the total time allowed for the entire process. For example, two-week delivery time from the date of receipt of the surrendered VHS tape to the shipment date of the DVD to Customer. Retailer may also provide a tracking number or a customer support number for verification of shipment of the respective DVD.

The customer will receive a DVD of the same title as the VHS tape surrendered, at the address (s)he specified in the online form in step 112, which comprises the transaction completion step in the ONLINE model.

For Customers who prefer to complete the transaction quickly, or who prefer not to submit personal/credit card information via the Internet, the RETAIL model will be elected in step 102. The initial step of the RETAIL model would entail the Customer going to the store location of a participating Retailer in step 114. Additionally, the Customer must bring the VHS tape which he or she wishes to migrate to DVD. Retailers may promote the VHS to DVD Migration Program via whatever advertising media they choose, so long as the content is within the guidelines established in the franchise agreement from the Filmmaker.

Upon entering the store location, the Customer will bring the tape to the space designated by the Retailer for the VHS to DVD Migration Program (possibly the customer service/returns desk, or some other specifically constructed kiosk for the VHS to DVD Migration Program). Retailers may wish to have loss prevention personnel inspect merchandise (including VHS tapes for the VHS to DVD Migration Program), which are brought onto the premises. They might attach a sticker or some other tag to the tapes, per store policy.

Upon arriving at the space designated by the Retailer for the VHS to DVD Migration Program, the Customer will surrender the VHS tape to the Retailer's authorized personnel in step 116. The Retailer's personnel will, in turn, catalog receipt of the Customer's tape, in accordance with the franchise agreement from the Filmmaker, and then disable or partially destroy the tape as required by the franchise agreement. This will likely include opening the end cap of the cassette and cutting the magnetic tape, or some other method for disabling or partially destroying the VHS tape.

Retailer will generally keep in their possession, for a specified period of time (per the franchise agreement), the surrendered VHS tapes in order for the Filmmaker to verify the numbers and/or audit Retailer. The Filmmaker may require an on site audit of the Retailer's VHS collection which may include the actual physical identification of all VHS tapes, software data, or any other form of record keeping established per the franchise agreement. In addition, the Filmmaker may require offsite verification in which the Retailer may be required to mail all surrendered VHS tapes to the Filmmaker for audit purposes. In the event an audit reveals a deficiency in the number of tapes in the Retailer's possession versus the number of tapes actually reported to the Filmmaker, the Filmmaker may have the option to terminate the franchise agreement with the respective Retailer and recoup the costs, if any, associated with the deficiency.

After the tape is cataloged and disabled, an in-store voucher (for use at the cashier) will be generated and given to the Customer at step 118. The computer system or software program that the Retailer uses to catalog receipt of the VHS tape may also be used to generate the voucher. The voucher might take the form of a bar-coded document or some other type of coupon that the Retailer chooses. The Retailer might also wish to include special offers or incentives on the voucher itself (such as a discount on the purchase of a DVD player or licensed merchandise relating to the movie title being exchanged).

In step 130, following receipt of the voucher, the Customer will proceed to the media department of the Retailer's store, select a DVD of the same title (s)he surrendered, and proceed to the checkout. If there are any special offers or incentives on the voucher, and the Customer wishes to avail him/herself of such offers, (s)he will retrieve the subject merchandise at this time, and bring it to the cashier for checkout.

Additionally in step 130, the customer will present the DVD and the voucher to the cashier. The voucher will function similarly to a coupon, which discounts the retail price of the DVD by the appropriate amount. The DVD that is subject to the exchange will register at the full retail price, when scanned at the checkout. The bar code or other code on the voucher will apply the appropriate discount to the DVD or any other specially offered merchandise identified on the voucher, at the time the voucher is scanned by the cashier.

At the time the Retailer establishes the connection to the Filmmaker's network, an automated data dump will occur, whereby all of the exchanges in the Retailer's system (since the previous data dump) will be uploaded to the Filmmaker's network. Based upon the information received from the Retailer's data dump, a credit will be calculated by the Filmmaker's network, which reimburses Retailer for the discount afforded to each Customer, via the VHS to DVD Migration Program. Credits will only be for the DVDs related to the VHS to DVD Migration Program and not for any other discounts offered by Retailer to customer (i.e. merchandise, DVD players). Should the Filmmaker elect to audit the results of the Retailer's data dump, the credit will be held until the audit is complete. Upon completion of the audit (or within a reasonable time after the data dump, if no audit is performed) the credit will accrue to the Retailer. The Retailer might elect to apply such credit amount to future orders of DVD items from the Filmmaker, or the Retailer may elect to cash out the credit, in which case a check for the amount of the credit (or an electronic funds transfer) will be disbursed to the Retailer.

The Customer will tender the discounted amount and thus complete the transaction as in step 112.

Using the embodying method described herein, the present invention provides a cost effective manner of doing such. While a preferred embodiment of the present invention has been described, it should be understood that various changes, adaptations, and modifications may be made therein without departing from the spirit of the invention.

What is claimed is:

1. A method of replacing an older technology with a newer technology, the method comprising the steps of:
   (a) providing an exchange program by which a retailer acknowledges customer's possession of the older technology and in exchange therefor, provides the newer technology to a customer, the retailer comprising one or more of the retailer and an agent thereof;
   (b) requiring that the newer technology and the older technology each has a portion that is the same and that each includes a different storage media type, wherein the portion comprises copyrighted material; and
   (c) causing a network or Internet connection between computers of at least two of the retailer, a provider of the newer technology or intermediary thereof, and the customer to communicate instructions and other information necessary to facilitate said exchange, via one of an online track and a retail track, wherein the online track enables the customer via a computer to (i) identify the older technology, (ii) input corresponding information of the customer, and (iii) receive information and instructions regarding processes for the exchange program, and wherein the retail track involves the retailer via a computer (i) cataloging technology transaction and (ii) transmitting information with respect to the catalogued transaction to one or more of the provider of the newer technology or intermediary thereof or the customer, in response to an in-person visit by the customer.

2. The method of claim 1, wherein the older technology is permanently surrendered to the retailer.

3. The method of claim 2, wherein the retailer receives the older technology from the customer via mail.

4. The method of claim 1, further comprising a step of the retailer providing to the customer a credit to be applied toward or a rebate on the price of the newer technology.

5. The method of claim 1, wherein the copyrighted material comprises a movie.

6. The method of claim 5, wherein the newer technology comprises one or more DVDs and the older technology comprises one or more VHS tapes.

7. The method of claim 1, wherein the copyrighted material comprises a movie, the newer technology and the older technology comprising different storage media types for the movie.

8. The method of claim 7, further comprising a step of the retailer promoting the exchange program to the customer via advertising media, wherein movies advertised as being part of the exchange program are of one or more film studios.

9. A method of replacing an older technology with a newer technology, the method comprising the steps of:
 (a) providing an exchange program by which a retailer provides to a customer a credit to be applied toward or a rebate on the price of the newer technology in exchange for permanent surrender of the customer's physical possession of the older technology to the retailer, the retailer comprising one or more of the retailer and an agent thereof;
 (b) requiring that the newer technology and the older technology each has a portion that is the same and that each includes a different storage media type; and
 (c) causing a network or Internet connection between computers of at least two of the retailer, a provider of the newer technology or intermediary thereof, and the customer to communicate instructions and other information necessary to facilitate said exchange via one of an online track and a retail track, wherein the online track enables the customer via a computer to (i) identify the older technology, (ii) input corresponding information of the customer, and (iii) receive information and instructions regarding processes for the exchange program, and wherein the retail track involves the retailer via a its computer (i) cataloging technology transaction and (ii) transmitting information with respect to the catalogued transaction to one or more of the provider of the newer technology or intermediary thereof or the customer, in response to an in-person visit by the customer.

10. The method of claim 9, wherein portion comprises copyrighted material.

11. The method of claim 10, wherein the newer technology comprises a first storage media type for supporting the copyrighted material, and the older technology comprises a second storage media type for supporting the copyrighted material, the first and second storage media types being different media formats.

12. The method of claim 11, wherein the copyrighted material comprises a movie.

13. The method of claim 9, further comprising a step of the retailer receiving the older technology from the customer via mail.

14. The method of claim 9, further comprising a step of the retailer physically receiving the older technology via the customer visiting a store location of the retailer.

15. The method of claim 2, wherein the retailer receives the older technology from the customer at a store location of the retailer.

* * * * *